United States Patent [19]

Lee

[11] Patent Number: 5,173,779
[45] Date of Patent: Dec. 22, 1992

[54] CAMCORDER WITH ELECTRONIC STILL-PHOTOGRAPHING FUNCTION

[75] Inventor: Jong P. Lee, Seoul, Rep. of Korea

[73] Assignee: Samsung Electronics Co., Ltd., Suwon, Rep. of Korea

[21] Appl. No.: 653,500

[22] Filed: Feb. 11, 1991

[30] Foreign Application Priority Data

Oct. 11, 1990 [KR] Rep. of Korea .............. 90-15653[U]

[51] Int. Cl.$^5$ .......................... H04N 5/225; H04N 5/76
[52] U.S. Cl. ............................... 358/213.26; 358/209; 358/909
[58] Field of Search ............ 358/909, 906, 209, 213.26, 358/213.23, 228

[56] References Cited

U.S. PATENT DOCUMENTS

| | | | |
|---|---|---|---|
| 4,553,170 | 11/1985 | Aoki | 358/909 |
| 4,660,102 | 4/1987 | Kawakami | 358/909 |
| 4,714,963 | 12/1987 | Vogel | 358/213.26 |
| 4,837,628 | 6/1989 | Sasaki | 358/909 |
| 5,027,218 | 6/1991 | Ueda | 358/213.23 |
| 5,040,072 | 8/1991 | Tsjui | 358/228 |

*Primary Examiner*—Tommy P. Chin
*Attorney, Agent, or Firm*—Robert E. Bushnell

[57] ABSTRACT

A camcorder with electronic still-photographing function including a camera circuit for providing an image signal, a video circuit for photographing an input image signal or for playing back a recorded image signal, an electronic still scene and a switching circuit including a first switching part and a second switching part. A camcorder with video circuits and additional switching and electronic still-photographing circuits stores the image signal in the video and still photographing circuit according to the connection state of the switching circuit, or exchanges the image signals in the video and electronic still-photographing circuit with each other.

8 Claims, 2 Drawing Sheets

CAMCORDER WITH ELECTRONIC STILL-PHOTOGRAPHING FUNCTION

BACKGROUND OF THE INVENTION

The present invention relates to camcorders and more particularly to a camcorder with an electronic still-photographing function, which performs the electronic still-photographing operation in photographing the image on a video tape or in playing back a recorded image in a video tape by including an electronic still-photographing circuit and a switching circuit.

Recently, camcorders which include both a video camera and a video tape recorder in a single body are widely available. Also electronic still cameras which store a particular still scene into an integrated circuit, and display it on a television monitor if necessary, are widely available.

But, in the past, there is no instrument which includes both the conventional camcorder and the electric still camera, and thus only a successive moving image was photographed, recorded and played back again by the camcorders. If the still scene, that is, the stopped scene is necessary, an additional electronic still camera is required in order to photograph the still scene and play it back. Thus, when the user cannot record both the successive scenes and the still scene, at the same time.

To solve these problems, an electronic camera which functions as a movie camera and as a still camera introduced in Japanese patent 58-3384 was invented, but this utilizes the same photographing memory for movie scenes and still scenes. Thus, the movie scene and still scene cannot be recorded at the same time and particularly a desired scene of the successive scenes can't be photographed as the still scene. Consequently, its applicable range is extremely restricted.

SUMMARY OF THE INVENTION

The present invention has been made in consideration of this and has for one object to provide a camcorder with electronic still-photographing function, which performs the photographing of successive movie scenes and electronic still scenes and allows electronic still-photographing in the playback of the recorded scenes, by including an additional electric still-photographing circuit and switching circuit.

According to the present invention, a camcorder with an electronic still-photographing function, includes a camera circuit, including a first color signal processor, for providing an image signal of an object, a video circuit, including a second color signal processor, for photographing an input image signal or for playing back a recorded image signal, an electronic still-photographing circuit for performing the still-photographing of the input image signal through an image storing integrated circuit card and for providing a photographed electronic still scene to a first monitor, and a switching circuit composed of a first switching part, located between the camera circuit and the video circuit, for connecting the camera circuit to either the video circuit or the first monitor according to a first control signal, a decoder, connected to the second color signal processor in the video circuit, for separating a luminance signal and a color signal from the second color signal processor into a new luminance signal and color-difference signals, a second switching part, located among the first color signal processor of the camera circuit, the decoder and the electronic still photographing circuit, for connecting either the first color signal processor or the decoder to the electronic still photographing circuit according to a second control signal.

BRIEF DESCRIPTION OF DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

The present invention will be now described in more detail with reference to accompanying drawings.

Figure 1:
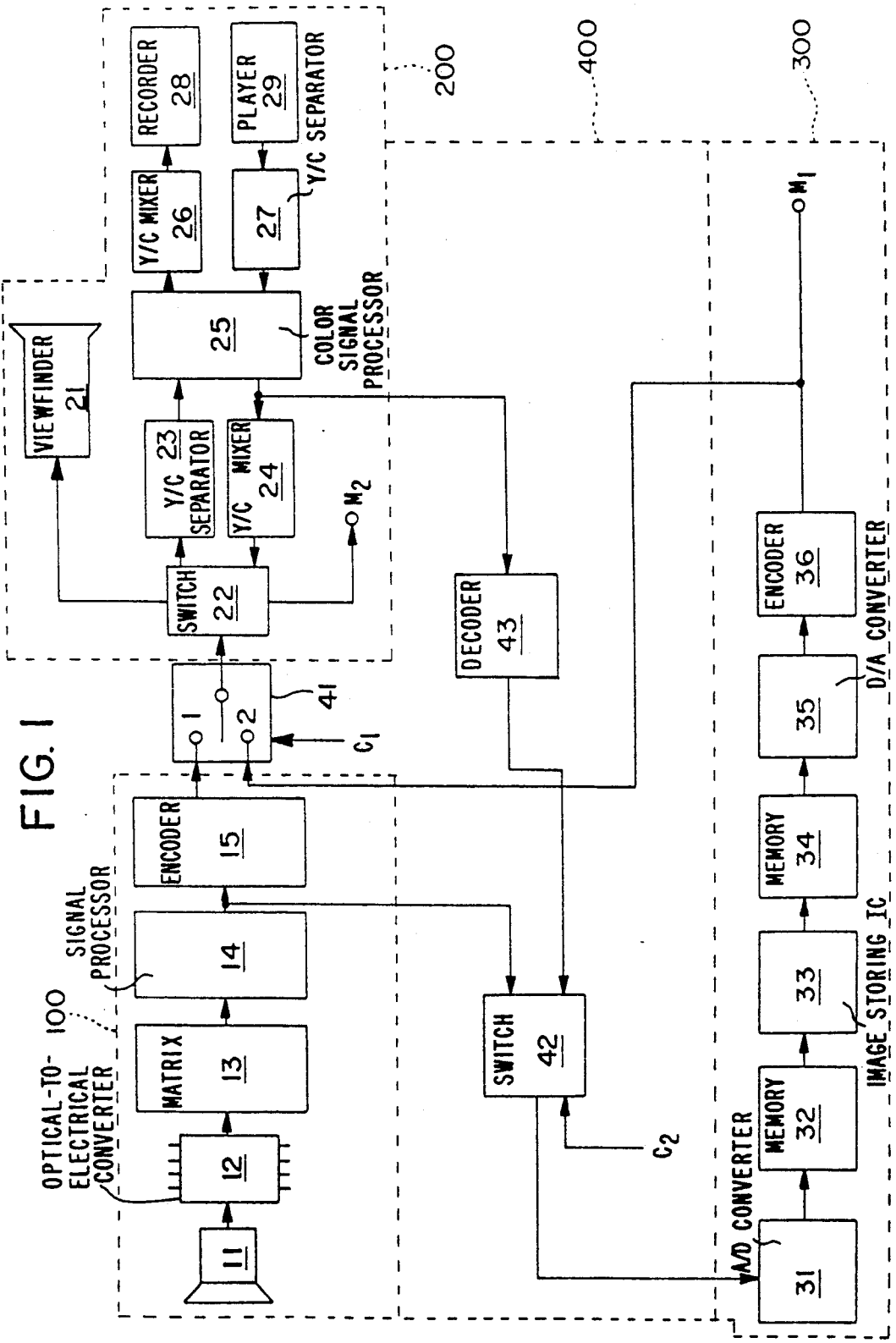
FIG. 1 is a camcorder circuit with an electronic still photographing function according to the present invention.

FIG. 1 shows a camcorder circuit with an electronic still-photographing function according to the present invention, which includes a camera circuit 100, a video circuit 200, a still-photographing circuit 300, and a switching circuit 400. The camera, video, and still photographing circuits 100, 200, and 300 are the same as the conventional circuits.

The camera circuit 100 includes an lens part 11, an optical-to-electrical converter 12 for converting an optical image signal to an electrical signal, a matrix 13 for converting the electrical signal to color signals R(Red), G(Green), and B(Blue), a first color signal processor 14 for providing a luminance signal Y and color-difference signals R-Y and B-Y by processing the color signals R,G and B, and an encoder 15 for providing an electrical image signal by combining the luminance signal Y and the color-difference signals R-Y and B-Y.

Next, the video circuit 200 includes a switching part 22, which is connected both to an electronic view finder 21 (hereinafter, termed EVF) and to a second monitor M2, for controlling first and second paths according to the manipulation of users, Y/C separators 23 and 27 for separating a luminance signal and a color signal Y from an input image signal, Y/C mixers 24 and 26 for providing an image signal by mixing the luminance signal Y and the color signal C, a second color signal processor 25 for amplifying the input signal and for removing the noise signals, a recorder 28 for recording and storing the input image signal, a player 29 for playing back the recorded image signal in the recorder 28.

In the video circuit 200, according to the control of the switching part 22, the input image signal from the camera circuit 100 is applied to the EVF 21, the second monitor M2, and the recorder 28 through a first path or the recorded image signal from the player 29 is applied to the EVF 21 and the second monitor M2 through a second path.

The first path is composed in the sequence of the Y/C separator 23, the second color signal processor 25, the Y/C mixer 26, and the recorder 28, while the second path is the sequence of the player 29, the Y/C separator 27, the second color signal processor 25, and the Y/C mixer 24.

The electric still-photographing circuit 300 includes an analog-to-digital (A/D) converter 31 for converting the luminance signal Y and the color-difference signals R-Y and B-Y to digital data, a first memory part 32 for storing the digital data provided from the A/D converter 31, an image-storing integrated circuit (IC) card 33 which is removable, a second memory part 34, a digital-to-analog (D/A) converter for converting the digital data to analog signals and an encoder 36 for changing the analog signals to an image signal.

Finally, the switching circuit 400 includes a first switching part 41, a second switching part 42, and a decoder 43. In the switching circuit 400, the first switching part 41 is interposed among the camera circuit 100, the video circuit 200, and the electronic still-photographing circuit 300 and then the output of the camera circuit is controlled by the control signal C1.

Figure 2:
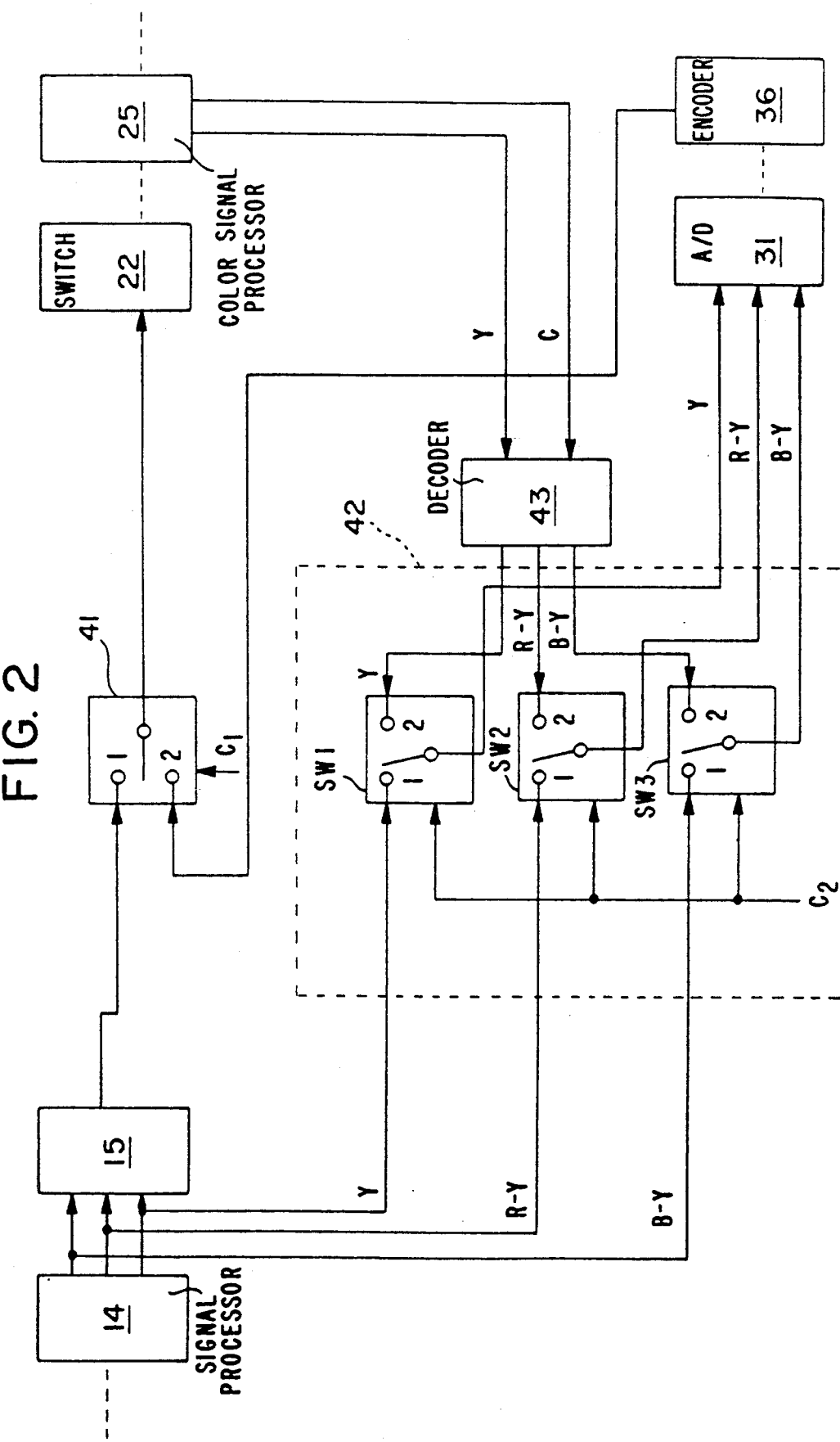
FIG. 2 is a switching circuit in a camcorder of FIG. 1 according to the present invention.

FIG. 2 is a detailed configuration of the switching circuit 400 of FIG. 1. As shown in FIG. 2, also, the second switching part 42 is connected to the decoder 43 which changes the luminance signal Y and the color signal C provided from the second color signal processor 25 to the luminance signal Y and the color-difference signals R-Y and B-Y.

In FIG. 2, a luminance signal Y provided from the first color signal processor 14 is applied to a terminal 1 of a switch SW1 in the second switching part 42, while another luminance signal of the decoder 43 is applied to a terminal 2 of the switch SW1. Thus, either the luminance signal provided from the first color signal processor 14 or another luminance signal provided from the decoder 43 is applied to the electronic still-photographing circuit 300 according to a control signal C2.

Also, a color-difference signal R-Y provided from the first color signal processor 14 is applied to a terminal 1 of a switch SW2 in the second switching part 42, while another color difference signal R-Y provided from the decoder 43 is applied to a terminal 2 of the switch SW2. Thus, either a color difference signal R-Y provided from the first color signal processor 14 or another signal R-Y provided from the decoder 43 is applied to the electronic still-photographing circuit 300 according to a control signal C2.

Similarly, a color difference signal B-Y provided from the first color signal processor 14 and another color difference signal B-Y provided from the decoder 43 are applied to the terminals 1 and 2 of a switch SW3 in the second switching part 42, respectively, and thus one of these signals is applied to the electric still-photographing circuit 300 according to the control signal C2.

The operation modes of the electronic still-photographing of the above described structure according to the present invention are largely divided into four types:

First, the camcorder searches an object by using the camera circuit 100 and the video circuit 200, and this mode is called the Electronic-to-Electronic (E-E) mode and even in this mode the electronic still-photographing is possible. In other words, a desired scene is still photographed during searching the object through the EVF 21 or the second monitor M2 by using the camera circuit 100.

An optical image signal through the lens 11 is converted to the electrical signal by the optical-to-electrical converter 12 and this electrical signal is changed to the color signals R, G, and B, by the matrix 13. Subsequently, these color signals R, G, and B are converted to the luminance signal Y, the color-difference signals R-Y and B-Y by the first color signal processor 14 and these converted signals are applied to the encoder 15 to provide the electrical image signal.

At this time, in order to perform the E-E mode, the user controls the first switching part 41 by the control signal C1 so that the electrical image signal of the camera circuit 100 is provided to the video circuit 200 through the terminal 1 of the first switching part 41. Also, the user controls the switching part 22 in the video circuit 200 so that the electrical image signal is applied to the EVF 21 or the second monitor M2. Then, the object at the front of the lens 11 in the camera circuit 100 is displayed on the EVF 21 or the second monitor M2.

In this case, if the user wants the electronic still photographing, the control signal C2 of the switches SW1~SW3 in the second switching part 42 is controlled by the user so that the output signals of the first color signal processor 14 are applied to the electronic still-photographing circuit 300 through the terminals 1 of the switches SW1~SW3.

Therefore, the luminance signal Y and the color difference signals R-Y and B-Y provided from the first color signal processor 14 are converted to the digital data by the A/D converter 31 in the electronic still photographing circuit 300 and the digital data are stored in the first memory part 32. Then, the user moves the image data in the first memory 32 toward the image-storing IC card 33 and stores the image data in the image-storing IC card 33 by manipulating a control switch (not shown in FIG. 1). And, the user moves and stores the image data in the first memory part 32 and moves it toward the image-storing IC card 33 by manipulating a control switch (not shown in FIG. 1).

Since the image-storing IC card 33 can be removed, the card 33 where the image data are stored is separately kept out (picked out) and then if the user wants to watch the image again, the image-storing IC card 33 is again put in, and the stored image data is transferred to the second memory part 34. Then, the image data transferred to the second memory part 34 are converted to the luminance signal Y and the color difference signals R-Y and B-Y by the D/A converter 35 and these converted signals are changed to the image signal again by the encoder 36 and provided to the first monitor M1. Subsequently, the image stored in the image storing IC card 33 is displayed on the first monitor M1.

Second, in the case of electronic still-photographing by the electronic still-photographing circuit 300 when the image of an object is recorded to the recorder 28 in the video circuit 200 through the camera circuit 100, the switch of the first switching part 41 and the switches SW1~SW3 in the second switching part 42 are all in the position of terminal 1, so that the still scene can be stored in the image-storing IC card 33 in the same manner as the first case, if necessary.

In addition, the user control the switching circuit 22 in the video circuit 200 so that the image signal of the camera circuit 100 through the first switching part 41 is applied to the first path of the video circuit 200 as well as the EVF 21 and the second monitor M2. Then, the image signal provided through the switching part 22 is separated into the luminance signal Y and the color signal C by the Y/C separator 23 and these luminance and color signals Y and C are amplified by the second color signal processor 25, whereas the noise components are removed.

The amplified luminance and color signals Y and C by the second color signal processor 25 are mixed by the Y/C mixer 26 and this mixed signal is recorded into the recorder 28. Thus, the image signal provided from the camera circuit 100 can be stored in the recorder 28 in the above described manner.

Third, in the case of electronic still-photographing by the electronic still-photographing circuit 300 when the image signal stored in the recorder 28 is displayed on the EVF 21 or the second monitor M2, the image signal stored in the recorder 28 is played back by the player 29 by the manipulation of the user. This image signal is separated into the luminance signal Y and the color signal C by the Y/C separator 27 and these separated signals Y and C are amplified by the second color signal processor 25, whereas their noise components are removed.

Subsequently, these signals Y and C are mixed by the Y/C mixer 24 and then the mixed signal is applied to the switching part 22. At this instant, the switching part 22 is disconnected with the first switching part 41 by the user's control, while the image signal provided from the Y/C mixer 24 is applied to the EVF 21 or the second monitor M2. During the playback of the image signal, if the user wants the still photographing of a desired scene, the user controls the switches SW1~SW3 in the second switching part 42 to be at the position of terminal 2.

That is, the luminance and color signals Y and C provided from the second color signal processor 25 are changed to the luminance signal Y and the color-difference signals R-Y and B-Y by the decoder 43 and these changed signals Y, R-Y, and B-Y are applied to the electronic still photographing circuit 300 when the switches SW1~SW3 in the second switching part 42 are all at the position of terminal 2.

Fourth, in the case storing of the image signal in the video circuit 200, previously stored in the image-storing IC card 33, the image signal stored in the image-storing IC card 33 in the electronic still-photographing circuit 300 is applied to the first switching circuit 41, by the user's control and is transferred to the recorder 28 in the video circuit 200 and transferred to the recorder 28 in the video circuit 200. At this instant, the user controls the control signal C1 so that the first switching part 41 is at the position of terminal 2. Also, the switching part 22 is controlled so that the image signal provided from the electronic still photographing circuit 300 is applied to the first path of the video circuit 200 and is displayed on the EVF 21 or the second monitor M2. Thus, the image signal in the image-storing IC card 33 is stored in the recorder 28 through the first path of the video circuit 200.

As mentioned above, the present invention incorporating the switching circuit and the electronic still photographing circuit into the camera and video circuits, can store the still scene in the image-storing IC card when the image of an object is photographed and recorded using the camera and video circuits and also can transfer the image signal in the image-storing IC card to the recorder in the video circuit by controlling the switching circuits. Thus, the present invention is very convenient and easy to use.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the present invention.

What is claimed is:

1. A video recorder with an electronic still-photographing function, comprising:
    camera means comprising a first color signal processor, for generating current image signals of an object;
    video means capable of storing motion picture image signals comprising a second color signal processor, for storing video image signals and playing back recorded image signals;
    image storing means for storing received image signals to be regenerated as stored still image signals;
    electronic still-photographing means for performing still-photography by selectively providing said received image signals to said image storing means and receiving said stored still image signals from said image storing means; and
    switching means for selectively interconnecting said camera means and said electronic still-photographing means to said video means, and for selectively interconnecting said camera means and said video means to said electronic still-photographing means according to first control signals and second control signals.

2. A video recorder with an electronic still-photographing function according to claim 1, wherein said switching means comprises;
    a first switching part for alternatively providing one of said current image signals generated by said camera means and said stored still image signals regenerated by said image storing means to said video means as said video image signals according to said first control signals; and
    a second switching part for alternatively providing one of said current image signals from said first color signal processor and said recorded image signals from said video means to said electronic still-photographing means as said received image signals according to said second control signals.

3. A video recorder with electronic still-photographing function according to claim 2, wherein said second switching part comprises:
    decoder means connected to said color signals processor for separating said recorded image signals into first luminance signals, first color difference signals, and second color difference signals;
    a first switch for alternatively providing second luminance signals representing said current image signals from said first color signal processor and said first luminance signals from said decoder means to said electronic still-photographing means as said received image signals, in accordance with said second control signal;
    a second switch for alternatively providing third color-difference signals representing said current image signals from said first color signal processor and said first color difference signals from said decoder means to said electronic still-photographing means as said received image signals, in accordance with said second control signals; and
    a third switch for alternatively providing fourth color difference signals representing said current image signals from said first color signal processor and said second color-difference signals from said decoder means to said electronic still-photographing means as said received image signals, in accordance with said second control signals.

4. A video recorder with electronic still-photographing function, comprising:
- camera means for generating current image signals of an object;
- video tape means for storing video image signals;
- video means capable of storing motion picture image signals, for recording said video image signals on said video tape means and for playing back recorded image signals recorded on said video tape means;
- image storing means for storing received image signals to be regenerated as stored still image signals;
- electronic still-photographing means for performing still-photography by selectively storing said received image signals in said image storing means and for playing back said stored still image signals stored in said image storing means; and
- switching means for selectively interconnecting said camera means and said electronic still-photographing means to said video means and for selectively interconnecting said camera means and said video means to said electronic still-photographing means in accordance with first control signals and second control signals.

5. A video recorder with electronic still-photographing function according to claim 4, further comprising first switching means for selectively providing said current image signals generated by said camera means and said stored still image signals stored in said image storing means to said video means as said video image signals.

6. A video recorder with electronic still-photographing function according to claim 4, further comprising second switching means for selectively providing said current image signals generated by said camera means and said recorded video image signals recorded on said video tape means to said electronic still-photographing means as said stored still image signals.

7. A video recorder with electronic still-photographing function according to claim 5, further comprising second switching means for selectively providing said current image signals generated by said camera means and said recorded video image signals recorded on said video tape means to said electronic still-photographing means as said stored still image signals.

8. A camcorder with electronic still-photographing function, comprising:
- camera/opto-electrical converter means for generating electrical image signals from optical images;
- matrix means for converting said electrical image signals into red, green and blue color signals;
- first signal processor means for converting said red, green and blue color signals into first luminance signals, first R-Y signals and first B-Y signals;
- first encoder means for generating first encoded image signals from said first luminance signals, said first R-Y signals and said first B-Y signals;
- first switch means for selectively providing said first encoded image signals and recorded still image signals as first selected image signals;
- video recording means for storing said first selected image signals on a video tape and for playing back first recorded image signals from said video tape;
- decoder means for converting said first recorded image signals into second luminance signals, second R-Y signals and second B-Y signals;
- second switch means for selectively providing one of a first group of signals and a second group of signals, said first group of signals comprised of said first luminance signals, said first R-Y signals and said first B-Y signals, and said second group of signals comprised of said second luminance signals, said second R-Y signals and said second B-Y signals;
- electronic still-photographing means for performing still-photography by storing said first group of signals and said second group of signals provided by said second switch means in an image storing integrated chip and for providing said recorded still image signals recorded on said image storing integrated chip to said first switch means.

* * * * *